Sept. 28, 1965  I. L. JOY  3,209,220
PATTERN CONTROL SUPERHETERODYNE MOTOR CONTROL SYSTEM
Filed Sept. 24, 1959 7 Sheets-Sheet 1

Inventor
Ivan L. Joy
By Mann, Brown & McWilliams
Attorneys

Sept. 28, 1965    I. L. JOY    3,209,220
PATTERN CONTROL SUPERHETERODYNE MOTOR CONTROL SYSTEM
Filed Sept. 24, 1959    7 Sheets-Sheet 3

Inventor
Ivan L. Joy
By Mann, Brown & McWilliams
Attorneys

Sept. 28, 1965  I. L. JOY  3,209,220
PATTERN CONTROL SUPERHETERODYNE MOTOR CONTROL SYSTEM
Filed Sept. 24, 1959  7 Sheets-Sheet 4

Inventor
Ivan L. Joy
By Mann, Brown & McWilliams
Attorneys

Sept. 28, 1965    I. L. JOY    3,209,220
PATTERN CONTROL SUPERHETERODYNE MOTOR CONTROL SYSTEM
Filed Sept. 24, 1959    7 Sheets-Sheet 5

Inventor
Ivan L. Joy
By Mann, Brown & McWilliams
Attorneys

Sept. 28, 1965            I. L. JOY            3,209,220

PATTERN CONTROL SUPERHETERODYNE MOTOR CONTROL SYSTEM

Filed Sept. 24, 1959            7 Sheets-Sheet 6

Inventor
Ivan L. Joy
By Mann, Brown & McWilliams
Attorneys

Sept. 28, 1965            I. L. JOY            3,209,220

PATTERN CONTROL SUPERHETERODYNE MOTOR CONTROL SYSTEM

Filed Sept. 24, 1959            7 Sheets-Sheet 7

Inventor
Ivan L. Joy
By Mann, Brown & McWilliams
Attorneys

United States Patent Office 3,209,220
Patented Sept. 28, 1965

3,209,220
PATTERN CONTROL SUPERHETERODYNE MOTOR CONTROL SYSTEM
Ivan L. Joy, 1616 W. Dudley Road, Topeka, Kans.
Filed Sept. 24, 1959, Ser. No. 841,972
10 Claims. (Cl. 318—18)

This invention is concerned with control systems in which control intelligence is represented in terms of variable frequency control signals and in which the controlled equipment is selective in its response to the control signals in accordance with the frequency value thereof.

The invention finds application to situations wherein it is desired to remotely and/or automatically control a certain physical property, condition, or characteristic of controlled equipment in accordance with a predetermined programming sequence.

More particularly, the invention finds important application in the burgeoning automation field and offers a new approach in controlling the position of a controlled member.

In accordance with the present invention, the positional control intelligence is programmed in the form of a variable frequency signal, the instantaneous frequency value of which represents the instantaneous positional relationship of the controlled member.

A control system employing frequency for representing intelligence and for controlling equipment offers many advantages, including the following:

(1) Frequency stability is, in general, readily maintained with a high degree of perfection;
(2) Frequency reading with extreme accuracy is possible with simple, low-cost equipment;
(3) Frequency representation of intelligence is compatible with analog and digital techniques and conversion between systems is readily accomplished;
(4) Temperature compensation is readily accommodated;
(5) Frequency-sensitive systems are flexible in application and adaptation to various methods of control, intelligence feedback, dynamic compensation, and anti-hunt techniques;
(6) Variable frequency signals are ideally suited for recording and reproduction with tape-recording equipment;
(7) Frequency-responsive position-sensing equipment for use in providing initial control intelligence or intelligence feedback may employ tuning techniques involving little or no friction, an important factor in sensing position of delicate equipment such as gyroscopes;
(8) Physical complexity, size and cost of frequency-responsive systems are greatly reduced; and
(9) Linearly responsive frequency-sensitive systems can be provided to facilitate remote programming of control intelligence and/or to eliminate need for intelligence feedback.

Other objects and advantages of the invention will be apparent during the course of the following description.

Figure 1:
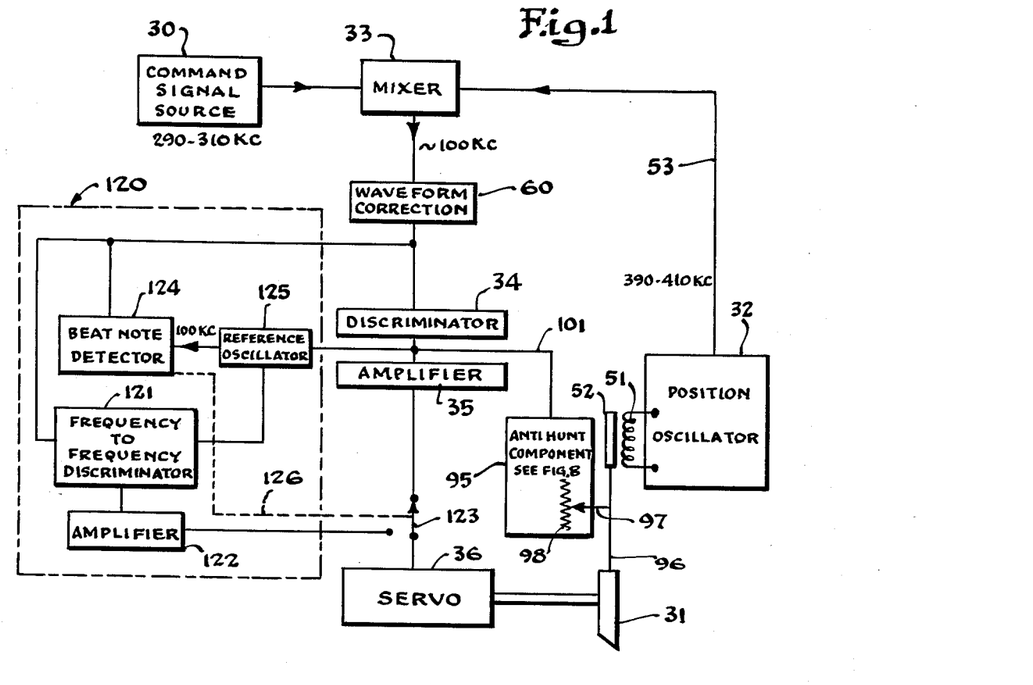
FIG. 1 is a representation of a simplified circuit diagram illustrating the basic arrangement of the control system of this invention and illustrating additional components for preventing hunting of the controlled equipment and for insuring more accurate zeroing in of the controlling equipment.

Referring now to the drawings, a simplified control system in accordance with the present invention is shown as including the following basic elements: a source 30 of command signals having a time-varying frequency characteristic representative of a desired position programming sequence for the controlled member 31 of the system; a position oscillator 32 having a position signal of variable frequency characteristic representative of the instantaneous position of the control member; a mixer stage 33 fed by the command signal source 30 and the position oscillator 32 and producing a varying frequency control signal, the frequency value of which is representative of the frequency difference between the command and position signals, with the output of the mixer having a predetermined coincidence frequency whenever the controlled member is in the precise position determined by the frequency value of the command signal source 30; a frequency discriminator 34 connected to receive the output from the mixer stage 33 and selectively responsive to opposite frequency departures from the predetermined coincidence frequency to produce an output voltage, the value of which correspondingly departs in opposite directions from a central or null point voltage value that represents the coincidence frequency; an amplifier 35 of any suitable type; and a servo mechanism 36 responsive to the output of the amplifier 35 and mechanically connected to the controlled member 31 for altering its position in opposite senses in accordance with the polarity of the voltage variation from the center point voltage of the discriminator output.

For purposes of disclosure, the controlled member 31 is diagrammatically illustrated as a cutting tool such as might be employed on a turning lathe, but it will be understood that the invention has application in any field where it is desired to position a particular mechanism for effecting a desired result; for example, a temperature-control knob or relay may be actuated by the present control system for maintaining a desired temperature condition or for varying a control temperature from one value to another selected value. The control system is useful with any form of machine tool and it may even be applied to the positioning of heavy mechanisms such as cranes. Similarly it can be applied to the control of the position of a gyroscope and other such sensitive equipment. It will become apparent that the accuracy and simplicity of this system commends it to any automatic or remote positioning application or other control problem wherein a condition such as temperature, pressure or the like may be regulated by a control mechanism.

In accordance with the principles of this invention, the control intelligence is represented in terms of frequency. The command signal has a reference frequency of predetermined value representative of the neutral position of the controlled member. Frequency values larger than this reference value represent positions of the controlled member that are spaced in one sense from the neutral position, and frequency values smaller than the reference value represent positions of the controlled member spaced in the opposite sense from the neutral position. In accordance with the preferred form of the invention the position of the controlled member is sensed by the position oscillator 32 and position intelligence is fed back to the command section of the control system for adjusting the output of the mixer stage 33 to the predetermined coincidence frequency as soon as the controlled member reaches the commanded position. So long as the controlled member is in its commanded position, the difference between the frequency of the command intelligence signal and of the feedback signal always equals the predetermined coincidence frequency.

The operation of the basic elements of the arrangement of FIG. 1 is now described with representative frequency values. The output from the command signal source 30 may have a frequency ranging in value from 290 kc., which represents one limit of movement of the controlled member, to 310 kc., which represents the opposite limit of movement of the controlled member. The position oscillator 32 has an output ranging in frequency from 390 kc. when the controlled member is at its first limit of movement to 410 kc. when the controlled member is at its opposite limit of movement.

It will be assumed that at 100 kc. the discriminator 34 produces a zero output voltage and that for frequency values above 100 kc. the discriminator produces an output voltage of negative polarity and for frequency values of less than 100 kc. the discriminator produces an output voltage of positive polarity.

Thus, if the command signal source puts out a signal of 290 kc., thereby commanding the controlled member to move to its first limit of movement from an assumed neutral position at which the output frequency of the position oscillator might be 400 kc., the output from the mixer is then the difference between 400 kc. and 290 kc. or 110 kc. In the assumed case, the output of the mixer 33 being 110 kc., the discriminator output is of negative polarity and is amplified and applied to the servo 36 to drive the controlled member 31 from its neutral position towards its first limit of movement. As it approaches and reaches this limit of movement, the output from the position oscillator approaches and reaches 390 kc. and hence, the output from the mixer approaches and reaches 100 kc. Correspondingly, therefore, the output from the discriminator approaches and reaches its assumed zero null value and the servo stops. The relationship between the input frequency at the discriminator and the output voltage of the discriminator need not be linear in many of the contemplated applications for this system, though in certain specific instances linearity is important.

In its various fields of application, this control system may be embodied in a variety of different relationships. For example, the command signal source 30 may comprise a tape-recorded signal that was prepared either at the actual point of use for the signal or at a central intelligence-programming station. The signal, if prepared at the point of use, could be prepared by manually manipulating the controlled member 31 through its desired sequence of movements, and during such sequence of movements, sensing the various positions of the controlled member by a position oscillator that produces an output frequency varying in accordance with the desired range. For example, if a number of identical pieces are to be cut on a turning lathe, the first piece is cut on the lathe in the usual fashion and during this operation, the position oscillator supplies a tape recorder with a frequency-varying signal representative of the particular cycle of movements that are required for cutting each piece to an identical shape.

In some instances it will be possible to predetermine the desired sequence of movements for the controlled member 31 and either manually or automatically vary the output frequency of an audio oscillator in accordance with the desired position sequence, with the oscillator output being recorded on a tape recorder. In other instances, it will be possible to have the position oscillator read a blueprint to profile the shape of the article that is to be fabricated and translate the positioning sequence thus sensed into frequency. In the case of profiling, it will be apparent that the profiling output signal might be applied directly to the control system, where the profiling and actual controlling are done at the same point. Similarly, an audio oscillator might be operated at the point of use of the control system.

Figure 2:
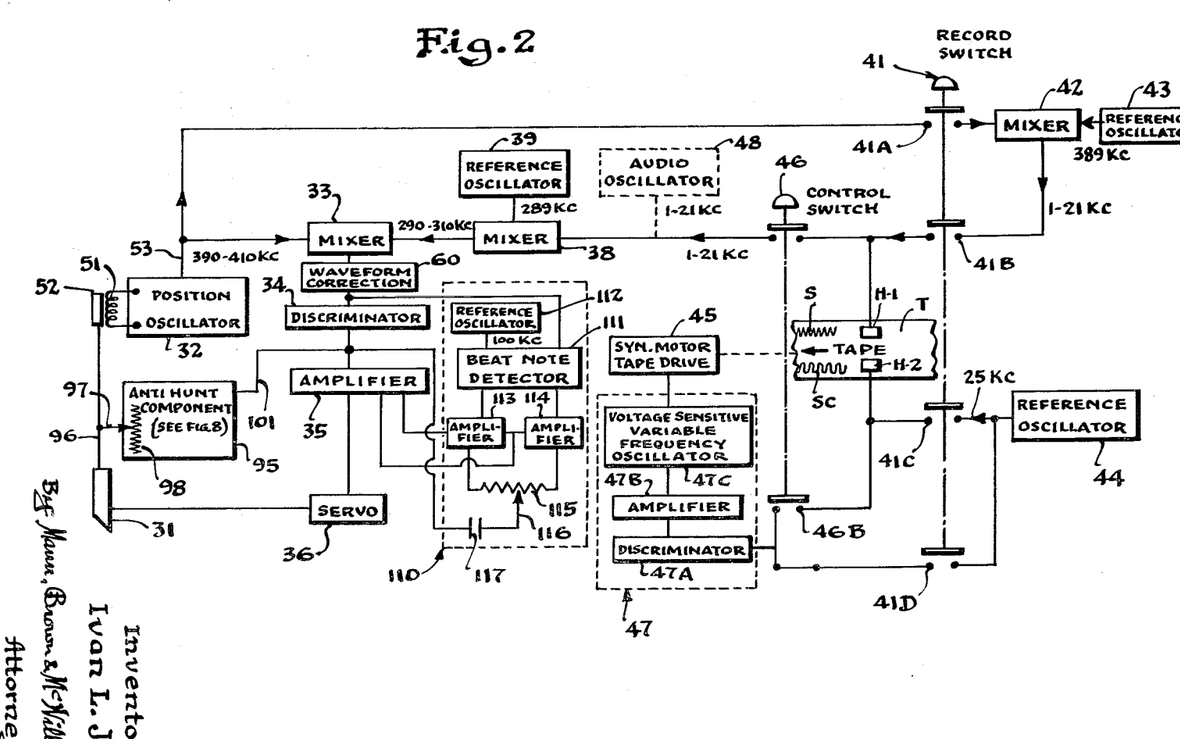
FIG. 2 is a diagrammatic illustration of a complete system arrangement of the type shown in FIG. 1 and includes additional tape recorder components and speed control mechanisms therefor for particular use in adapting the system for various conditions of intelligence supply.

A control system arrangement illustrating the application of the system of the present invention to tape recording under various conditions of intelligence supply is shown in FIG. 2. In FIG. 2, the control system frequencies are selected at the same values as were employed for FIG. 1, and it will be understood that the controlled member 31, the position oscillator 32, the mixer stage 33, the discriminator 34, the amplifier 35, and the servo mechanism 36, which are designated by identical reference characters in FIGS. 1 and 2, function in the same fashion. The general arrangement for handling the application of a tape-controlled command signal to the control system of this invention is illustrated as including a recording tape T having a pickup head H1 for a signal channel that is provided with a variable frequency command signal such as is represented at S, the frequency value of which ranges from 1 to 21 kc. It will be recalled that this signal S may be applied to the tape by any of a number of procedures. A supplemental mixer stage 38 is fed both from the pickup head H1 which supplies the command signal and from a reference oscillator 39 having a fixed frequency output of 289 kc. Thus, in the illustrative example chosen for purposes of disclosure, the output from mixer stage 38 ranges in value from 290 kc. to 310 kc. and the combination of the tape channel, the reference oscillator 39 and the mixer stage 38 produces an output that corresponds with the command signal source 30 of FIG. 1.

One arrangement for providing the control signal S on the upper channel of the tape T, which has been referred to hereinabove, is to actually put the controlled member 31 through its sequence of movements while sensing these movements by the position oscillator 32 and with the main section of the control system cut off, the output of the position oscillator is fed over line 40 and through a record switch 41 having an upper set of contacts 41A to supply a mixer stage 42 that is also supplied from a reference oscillator 43 having a fixed frequency output of 389 kc. Thus, the output of the mixer stage 42 may range between 1 and 21 kc. and when the record switch 41 is closed, its contact set 41B connects the output of mixer 42 to the record section of head H1. Since the absolute value of the frequency that is recorded on the tape channel and subsequently sensed and transmitted to mixer stage 38 is dependent upon the travel speed of the tape, the system contemplates automatic speed-control for the tape and this is shown generally as including a reference oscillator 44 having a fixed frequency output of 25 kc. that is applied to magnetic head H2 through contact 41C of the record switch and that is applied to a synchronous motor type speed drive 45 through contact 41D.

During the recording operation, head H2 is associated with a lower channel of the tape T for recording the 25 kc. speed-control signal such as is represented at SC. During the position-controlling function, the head H2 supplies the 25 kc. signal sensed from the lower channel of the tape T through contact 46B of control switch 46 to a speed control circuit 47, the output of which determines the speed of the tape-drive mechanism 45 so that the tape is driven at a speed such that the signal sensed from the lower channel is always maintained at 25 kc.

The speed control circuit which is designated generally at 47 includes a frequency discriminator 47A and amplifier 47B that may correspond to the discriminator 34 and amplifier 35, respectively, of the main control system, with the discriminator having a null point corresponding to 25 kc. Finally, the speed control circuit includes a variable frequency oscillator 47C responsive to the output of amplifier 47B and connected to control the speed of the synchonous motor of the tape drive 45.

When the tape speed is such that the signal supplied by head H2 is 25 kc., a null output exists at amplifier 47B and the frequency of oscillator 47C is such that the synchronous motor maintains this desirable speed condition. It will be noted that as long as the 25 kc. note is maintained, the signal S from head H1 will be true.

If the output of head H2 tends to fall below 25 kc., either due to stretching of the tape or due to irregularities during the recording operation, the discriminator 47A puts out a voltage signal of a polarity appropriate to raise the frequency at the output of oscillator 47C. Similar compensation occurs when the signal from head H2 tends to exceed 25 kc. to correspondingly decrease the tape speed until 25 kc. output is restored.

It will be noted that the synchronous motor drive for the tape is controlled by the 25 kc. output from reference oscillator 44 which is shown connected to the speed control circuit 47 through contact 41D during the recording operation. Obviously the reference oscillator 44 could be connected through a frequency divider of appropriate ratio to feed the synchronous motor as the speed control circuit is passive during the recording operation. Since speed control is employed during the position control cycle, speed control is not actually required during the recording phase.

It will be appreciated that since the command signal S was produced by putting the controlled member 31 through its paces, the physical characteristics or personality of the mechanism actuating the controlled member is actually incorporated into the recording, and if this same mechanism or machine is then operated under the control of the type, there is a built-in compensation effect.

By way of illustration, an audio oscillator 48 as shown in dotted lines in FIG. 2, may be connected to supply mixer stage 38 instead of using the tape-recorded signal S. When audio oscillator 48 is thus connected, it will be understood that both control switch 45 and record switch 41 will be open. The audio oscillator 48 may be manually manipulated either directly or by connection to a simulated control member for making up a programming sequence. In any event, the audio oscillator puts out a varying frequency signal ranging from 1 to 21 kc. and feeds mixer stage 38 and the control system functions in identical fashion but in accordance with the frequency of the signal supplied thereto.

Figure 3:
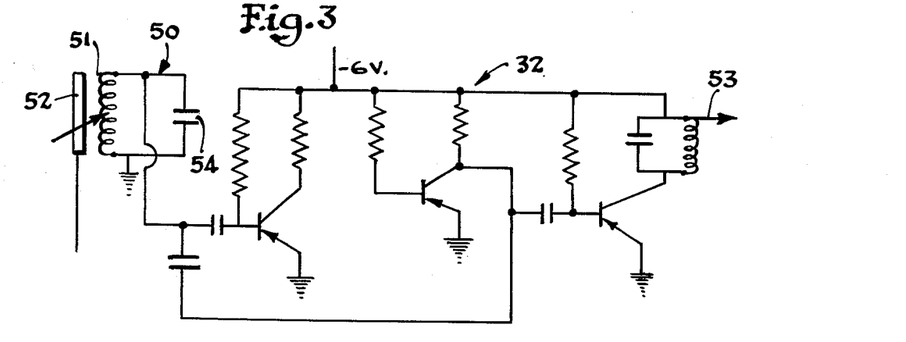
FIG. 3 is a detailed diagram of a preferred form for the oscillator component of the present system.

The position oscillator component 32 of the arrangements shown in FIGS. 1 and 2 is illustrated in FIG. 3 as a transistorized version of a Franklin oscillator, and in its frequency-determining circuit 50, it has an inductance coil 51 operatively associated with a tuning slug 52 that is movable endwise to vary the effective inductance of coil 51 and thereby to vary the resonant frequency of the tuning circuit 50 and hence the frequency value appearing at the output connection line 53 of the position oscillator 32 (FIGS. 1 and 2). Depending upon the requirements of the control problem, the motion of the tuning slug 52 may, if necessary, be correlated so that it produces a linear change in the frequency value at the output line 53. The manner of accomplishing this will be apparent to those skilled in this art. It will also be apparent that instead of employing a tuning slug for varying the inductance of coil 51, the tuning range may be accomplished by causing the movements of the member, the position of which is being sensed, to vary the capacity of the tuning condenser 54 (see FIG. 3). It is preferred, however, because of the relative ease of providing temperature compensation, to employ the variably tuned inductance principle rather than capacitance.

Figure 4:
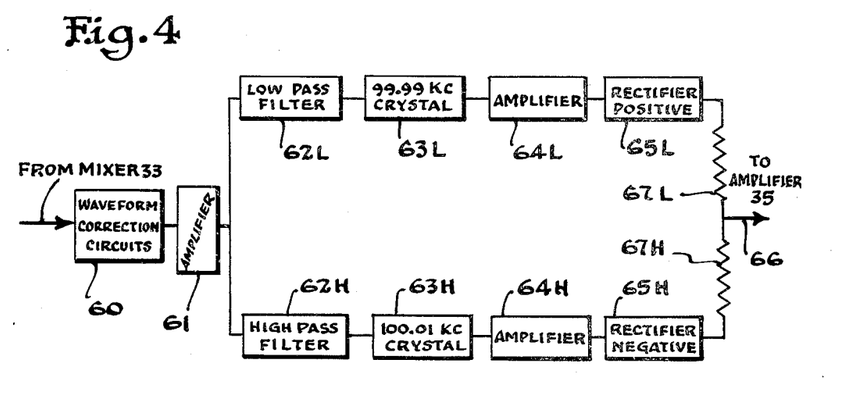
FIG. 4 is a detailed block diagram of the preferred form of the discriminator component of the system.
Figure 5:
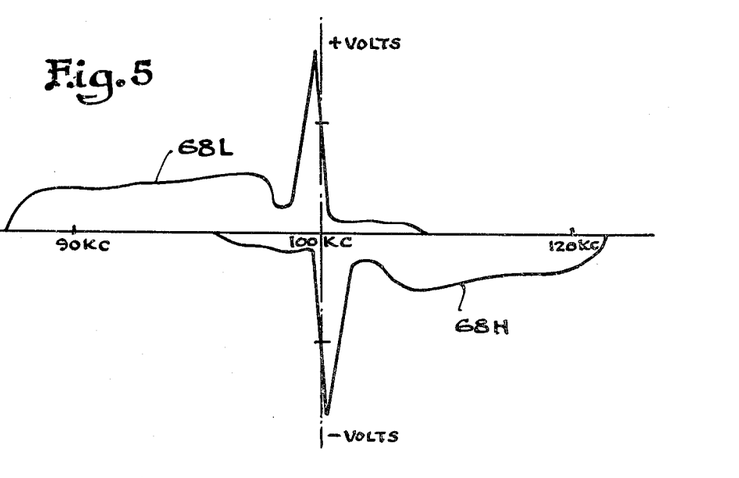
FIG. 5 illustrates the response curves for the discriminator channels of the FIG. 4 arrangement.

The frequency discriminator component 34 of the arrangements of FIGS. 1 and 2 may be any type of frequency-sensitive device such as an oscillator, ratio detector, amplitude discriminator, or any other device that is capable of determining a deviation from the 100 kc. frequency value and changing the information into voltage, the polarity of which, with reference to a central or null point voltage, is related to the sense of the frequency deviation from the 100 kc. reference value. A preferred form of frequency discriminator device is shown in FIG. 4 and is described in relation to its characteristic frequency cutoff curves which are shown in FIG. 5. The circuit of FIG. 4 includes waveform correction circuits 60 that may be of any suitable form known to those skilled in this art. According to one technique, a series of tuned inductances of proper band width may be employed for correcting wave form. It should be noted that in the mixer stage 38 shown in FIG. 2, it is necessary to mix a reference oscillator signal of 289 kc. with a command signal that ranges from 1 to 21 kc. The great disparity between the frequencies of the two signals that are being mixed results in a tendency for the waveforms to bunch and to separate, as in frequency modulation, and this bunching or spreading of the waveform is not ideally compatable with the frequency discriminator arrangement employed for translating the frequency signal into voltage suitable for directional control of the servo mechanism. The output from the waveform correction circuits 60 is fed to a suitable amplifier 61, the output of which is fed into a two-channel, high-pass–low-pass filter combination.

The low-pass channel comprises a low-pass filter 62L tuned for cutoff at 100 kc. while still providing a good signal at 95 kc., a low-side response crystal 63L tuned, for example, to a frequency value of 99.99 kc., an amplifier 64L and a rectifier 65L for producing positive voltage output, the rectifier 65L is preferably a voltage quadrupler type rectifier for developing gain with good stability and as such its performance is not equalled by conventional amplifier equipment.

The high-pass channel is comprised of similar elements designated 62H through 65H with the high-pass filter 62H being tuned for cutoff at 100 kc. while also maintaining a good signal at 105 kc. The high-side response crystal 63H is tuned to a value of 100.01 kc. The arrangement is such that a center tap 66 of a divider network having resistors 67L and 67H connected across the outputs of the positive and negative rectifiers 65L and 65H, respectively, reads zero voltage when the output from the mixer stage 33 is exactly 100 kc.

To achieve a properly accurate null reading when the frequency signal to the discriminator is exactly 100 kc., the high and low pass crystals are matched so that their cut-off curves shown at 68L and 68H, respectively, in FIG. 5, have equal and opposite output voltages at 100 kc. Each of these cut-off curves represents the composite effect of the filter and the crystal and the important feature that contributes to the accuracy of the present system resides in the extremely steep character of the curves right at the 100 kc. region. Since the accuracy and stability of the cross-over control is dependent principally upon the crystals, the accuracy of the system is only slightly affected by any drift caused from change in the inductances or in the tubes employed in the electronic circuitry. To further improve the stability, the crystals may be temperature controlled, and tests have proven that a change rate of one volt per cycle can readily be obtained at the cross-over point which, in the illustration chosen for purposes of disclosure, is at 100 kc.

To illustrate the accuracy capabilities of the system, it will be assumed that the 20 kc. range of variation for the command signal source represents an overall range of movement of $\frac{1}{10}''$, and assuming that the amplifier 35 (FIG. 1 or FIG. 2) is provided with sufficient gain so that $\frac{1}{10}$ volt input to the amplifier is sufficient to operate the servo mechanism 36 and assuming a change rate of one volt per cycle, a resolution of one part in 200,000 is obtained over the $\frac{1}{10}''$ of assigned travel for the controlled member, and this results in a full power sensitivity of $2 \times 10^{-7}''$, with the basic stability of the system being dependent only upon the quartz crystals.

Figure 6:
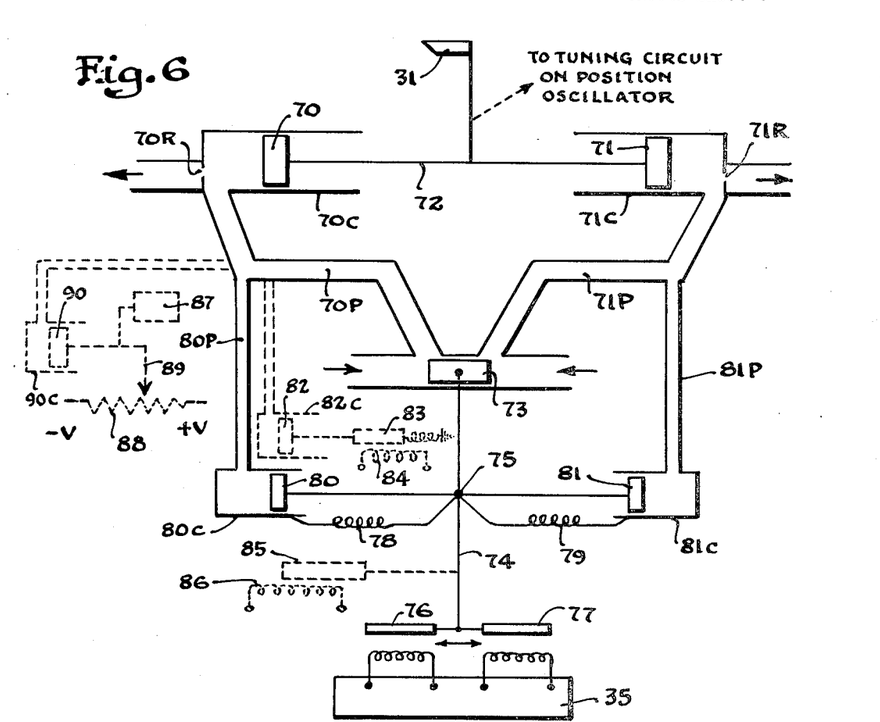
FIG. 6 is a simplified diagrammatic illustration of a hydraulic servo component for use in this system and includes illustrations of a number of alternative refinements for improving the accuracy of the hydraulic servo.

The servo mechanism illustrated generally at 36 in both FIGS. 1 and 2 may be any conventional type of servo motor or may be of a hydraulic construction such as is shown in FIG. 6. The hydraulic servo is shown as including opposed pistons 70 and 71 interconnected by a rigid link 72 which is, in turn, rigidly connected to the controlled member 31. The pistons 70 and 71 operate in cylinders designated 70C and 71C, respectively, under the control of hydraulic pressure created by fluid supplied through passages 70P and 71P, respectively. The flow of hydraulic fluid in these passages is limited by restrictions shown at 70R and 71R so that high pressure is built up in the system to operate the pistons 70 and 71. Division of flow through the hydraulic passages 70P and 71P and hence the pressure relationships behind pistons 70 and 71 is controlled by a block-like valve body 73 reciprocable endwise in a valve chamber to selectively vary the flow rate through each passage. Movement of the valve body 73 is controlled by a rigid operating arm 74 that is fulcrumed at the point designated 75, with the opposite end of this actuating arm being connected to opposed solenoids 76 and 77 which are connected in the output of amplifier 35 of FIGS. 1 and 2. For frequencies above 100 kc. which produce negative output voltage at the amplifier, solenoid 76 will operate to position the controlled member 31 in one sense. For frequencies less than 100 kc. the controlled member will be positioned in the opposite sense by solenoid 77.

The control system, including the hydraulic servo, functions in the same fashion as described previously. When the command signal requires a certain positional change of the controlled member 31, the appropriate one of solenoids 76 and 77 is operated to move the controlled member until the position oscillator, which is rigidly connected to the mechanism for positioning the controlled member 31, indicates that the proper position has been reached. At this point the output of amplifier 35 balances and the solenoids 76 and 77 are correspondingly balanced such that the valve body 73 assumes a balance, centered position and restores an even division of flow through passages 70P and 71P and causes the controlled member to remain in its present position.

To compensate for dynamic flexibility in the controlled member or machine or in the mechanical connections between the servo and the controlled member, the fulcrum 75, which is heavily spring loaded to the frame of the hydraulic servo by opposed springs 78 and 79 and which is positioned by these springs in a proper centered relationship, is connected to a supplementary pair of opposed pistons 80 and 81 operating in cylinders 80C and 81C, respectively. When the pressure in the hydraulic system at the points 70R and 71R is equal, equalized pressures are transmitted through the supplemental passages 80P and 81P, and thus equalized pressures are applied at the fulcrum 75, which remains in its centered position as no compensation is required for this condition and none is provided.

Assuming, however, for purposes of illustration, that the pressure at point 71R increases and the pressure at point 70R decreases, the pressure in cylinder 81C increases while the pressure in cylinder 80C decreases, and this causes the fulcrum 75 to move against the balanced action of the springs 78 and 79 and shift leftward as viewed in FIG. 6 to compensate for the dynamic loading on the controlled member 31. For example, if the controlled member 31 should bend .020" while cutting or moving a load, the compensating fulcrum 75 will shift the valve body 73 correspondingly to give positive mechanical feedback and correct for the flexing of the controlled member. The extent of this feedback must, of course, be correlated by test or otherwise and built into the servo in proper relation.

Instead of the compensating fulcrum arrangement shown in full lines in FIG. 6, alternative arrangements are contemplated for compensating for the dynamic characteristics of the controlled members and the mechanical linkages to the controlled members. In one such arrangement a piston 82 operates in a cylinder 82C connected through a supplemental flow passage to the hydraulic flow passage 70P to transmit the pressure condition existing in this passage to cylinder 82C for operating the piston 82 and vary the positioning of a solenoid 83 which is spring-loaded to a neutral position with relation to a coil 84. The coil 84 would be connected in series with the inductance 51 of the tuning circuit 50 of the position oscillator that is shown in FIG. 3 and movement of the tuning slug or solenoid 83 relative to the coil 84 effects a frequency change in the position oscillator to compensate for the dynamic characteristics in the controlled member components of the system. Obviously the inductance arrangements shown at 83 and 84 could be satisfied by a condenser arrangement which would then be connected in parallel with the condenser 54 of the tuning circuit 50. However, temperature compensation can best be provided with inductance components.

Another alternative arrangement for providing positive load compensation employs a tuning slug or solenoid shown at 85 in FIG. 6 connected directly to the actuating arm 74 and an induction coil 86 controlled by the tuning slug 85 with this coil again being connected in series with the inductance 51 of the position oscillator's tuning circuit 50. Feedback is again accomplished by altering the frequency of the position oscillator.

Still a further alternative arrangement for providing positive loading compensation is shown in FIG. 6 wherein numeral 87 designates an electronic reactance component which may be either inductive, capacitive, or a saturable reactance and this electronic reactance 87 is appropriately connected in the tuning circuit 50 for varying the output frequency of the position oscillator of FIG. 3. The electronic reactance is controlled in its reactance characteristic in accordance with the voltage supplied from a potentiometer 88 having its movable contact arm 89 connected to a piston 90 which operates in a cylinder 90C that is in communication with and subjected to the pressure condition existing in hydraulic flow passage 70P.

Figure 7:
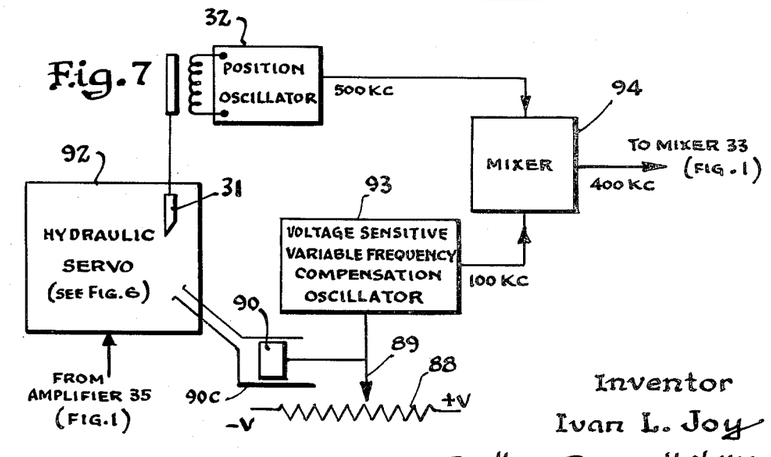
FIG. 7 illustrates diagrammatically a connection arrangement for the hydraulic servo of FIG. 7 to the position oscillator section of the control system for providing load compensation in terms of the frequency signals.

In the various positive loading compensation systems discussed above and shown in dotted lines in FIG. 6, it has been mentioned that the frequency feedback effected by these arrangements is carried out in the position oscillator itself. However, in some instances it is desirable that the position oscillator 32 of FIGS. 1 and 2 be complete unto itself and an arrangement for effecting a frequency feedback type of positive load compensation without altering the position oscillator itself is shown in FIG. 7, wherein, for convenience of understanding, the position oscillator 32 is shown with its tuning slug connected to the controlled member 31, which is in turn positioned by the hydraulic servo indicated generally at 92. In this instance the feedback system to the piston 90 and cylinder 90C for controlling the contact arm 89 of the potentiometer 88 is connected to provide a variable voltage control for an oscillator 93 which feeds a mixer 94 that also is connected to the output of the position oscillator 32.

In the arrangement of FIG. 7 it will be assumed that the position oscillator 32 has a frequency range centered about the 400 kc. point and that the oscillator 93 has a frequency range centered about the 100 kc. point, so that the output from the mixer 94 is centered about the 300 kc. point and this selection of frequencies is compatible with the remaining components shown in FIGS. 1 and 2. Obviously the other dotted line illustrations of FIG. 6 wherein frequency feedback for achieving positive loading compensation is achieved by means of tuning slugs controlling inductances that are connected in a tuned circuit could also be applied to the control of the frequency of oscillator 93 of FIG. 7. The compensation provided by any of these techniques may obviously be either positive or negative, as desired. Finally, it should be understood that where inductive type control variables have been illustrated and described, capacitance-type control variables also find use.

Figure 8:
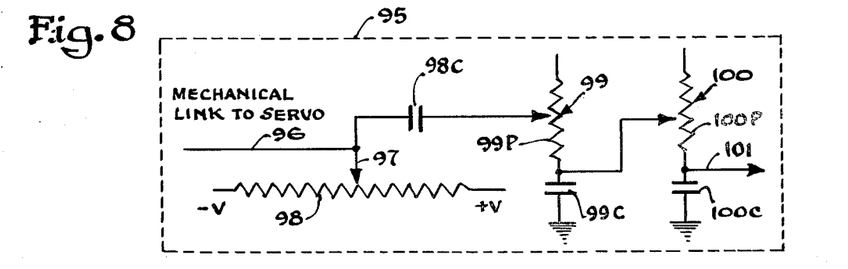
FIG. 8 is a diagrammatic illustration of a circuit for use in the systems of FIG. 1 or 2 for providing anti-hunt capabilities.

In the control systems shown in FIGS. 1 and 2, in each instance there is included an anti-hunt component 95 connected mechanically to the controlled member 31 to respond to positional changes thereof and connected electrically to the input of the amplifier 35 for feeding back a D.C. waveform with proper delay to enable the servo mechanism, whether it be a conventional motor or the hydraulic servo of FIG. 6, to zero in accurately without hunting or oscillation. The details of this anti-hunt component 95 are shown in FIG. 8 wherein the arm 96 illustrates a mechanical link between the controlled member 31 and an arm 97 of potentiometer 98. Any movement of the controlled member 31 from an established position causes a corresponding movement of the potentiometer arm 97 to produce a D.C. pulse that is transmitted back to the input of amplifier 35 through an intermediate condenser 98C and through delay networks comprising resistor and capacitor combinations 99 and 100, respectively. The potentiometers 99P and 100P adjustably control the extent of the delay of the signal which is fed back through the condensers 99C and 100C. Proper adjustment of these elements permits the servo to zero in without bounce. When the anti-hunt component of FIG. 8 is to be employed with the hydraulic servo arrangement shown in FIG. 6, the potentiometer arm 97 may, instead of being mechanically linked to the controlled member 31, be connected to the actuator arm 74 and will produce the anti-hunt D.C. pulse for neutralizing servo hunting in a corresponding fashion.

Figures 9, 10:
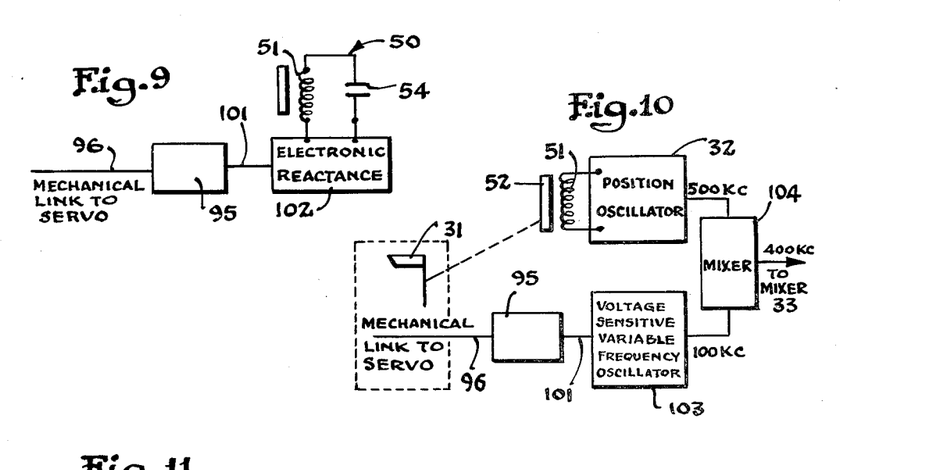
FIGS. 9 and 10 are separate circuit arrangements illustrating alternative anti-hunt arrangement which depend upon sending back a frequency variable signal.

An alternative arrangement for accomplishing an anti-hunt control is shown in FIG. 9 wherein the anti-hunt component is designated generally as 95 and is shown for ease of understanding with the mechanical link 96 at its input and with an electrical connection line 101 which, in this instance, supplies the D.C. pulse to an electronic reactance 102, which in turn may be connected in the tuning circuit 50 of the position oscillator 32 of FIG. 3, the tuning circuit 50 being shown in FIG. 9 for completeness of the illustration. The D.C. pulse which is fed back from the anti-hunt component 95 of FIG. 9 causes a temporary negative feedback in terms of frequency.

An alternative embodiment of an anti-hunt circuit arrangement is shown in FIG. 10 wherein the anti-hunt component 95 is again connected to the servo by a mechanical link 96 and by an electrical lead 101 to control a voltage-sensitive variable frequency oscillator 103 which feeds a mixer 104 that is also supplied from position oscillator 32. As in the case of FIG. 7, the position oscillator has a frequency range centering about 500 kc. and the voltage-sensitive oscillator 103 has a frequency range centering about 100 kc. so that the output of mixer 104 centers about 400 kc. and the arrangement is thus again compatible with the remaining components of the control system shown in FIG. 1.

Still another arrangement for providing anti-hunt increments of voltage is shown in proper connection to the control system of FIG. 2 and is designated generally at 110. In this arrangement a beat note detector 111 has its input connected to a reference oscillator producing a fixed frequency of 100 kc. and to the output of mixer stage 33, which has a frequency ranging about the 100 kc. value. Whenever the controlled member 31 is not zeroed in on the position required by the control signal, the output from mixer stage 33 deviates from 100 kc., and such deviations develop a beat note in the output of the beat note detector 111. The beat note detector has two output channels, one of which includes amplifier 113, which is connected to D.C. amplifier 35 so that when the output from amplifier 35 is causing servo 36 to drive the control member 31 in one direction only, amplifier 113 is rendered operative. The other channel includes a corresponding amplifier 114 also connected to the output of amplifier 35 and rendered operative when the amplifier actuates the servo to drive the controlled member in the opposite sense or direction. Amplifiers 113 and 114 have their outputs connected to a voltage divider network 115 having a center tap connection 116 feeding the input to amplifier 35 through a condenser 117.

Assuming output exists at the beat note detector 111 and that this output is being amplified in amplifier 113, a voltage of positive polarity is built up at condenser 117 and is effective to clip the input to the D.C. amplifier 35 by one or two volts. Thus, as the controlled member approaches its commanded position, the beat note frequency becomes lower and a reactance that is provided across a suitable condenser contained in the output of amplifier 113 causes a voltage decay with the lowering beat frequency and produces a negative feedback wave increment to counteract servo bounce. The negative feedback wave increment arrives before the D.C. component, thus slowing down the servo and controlled member as they zero in at the commanded position. This technique offers an inherent advantage when used to stop servo bounce. When a servo mechanism is loaded, it will spend less time on the loaded side oscillation and more on the unloaded side. Thus, more voltage is generated in the counteracting wave form during the longer time interval of the unloaded side oscillation. With the arrangement just described, however, feedback is provided which is compensated for loading of the servo. The timing of the feedback wave increment may be adjustably controlled by employing a delay network such as is shown at 99 and 100 in FIG. 8. It should be noted that the hunt-cancelling feedback control described above has the advantage that feedback is applied only when and as needed and that the feedback system does not detract from the sensitivity of the main section of the control system.

While one of the principal advantages of the present control system is the extremely high resolution which makes it possible, there are a number of procedures for even further increasing the resolution capabilities of the system. One such arrangement for accomplishing higher resolution is to utilize the components of the basic system in conjunction with a frequency-to-frequency discriminator arrangement which is designated generally at 120 in FIG. 1. The frequency-to-frequency discriminator is shown at 121 and its output is connected through a D.C. amplifier 122 and a selectively positionable control switch 123 to feed the servo mechanism 36. The switching control for the frequency-to-frequency discriminator is provided in the form of a beat note detector 124 having its input connected to the mixer stage 33 and to a reference oscillator having a fixed output of 100 kc. It will be understood that the frequency-to-frequency discriminator 121 is only efficient when the frequencies being compared are relatively close. Therefore, switch 123 is normally positioned to receive output from amplifier 35 under the usual operating conditions of the circuit. As amplifier 35 controls the servo to bring the servo relatively close to its commanded position, the beat note detector 124 will respond to the two inputs to which it is subjected and will operate a suitable relay to control switch 123 over a control line 126, this structure being indicated only diagrammatically for simplicity of disclosure. Thus the beat note detector 124 responds only to beat note frequencies that are well below the resonant frequency of the servo mechanism 36 and at such beat note frequencies cuts in the frequency-to-frequency discriminator 121, which takes over the control of the servo 36. By way of example, if it be assumed that the dynamic speed characteristic of the servo is ten cycles per second per second, the beat note detector would switch in at a five cycle beat note. This technique offers high resolution capabilities.

Still other techniques are contemplated for improving the resolution characteristics of the discriminator of FIG. 4. According to one such arrangement, the frequency fed to the discriminator 34 may be multiplied by as much as 100 times and each crystal channel may be provided with a bank of slope-steepening crystals. With this technique it is possible, theoretically, to read and respond to position changes on the order of $16 \times 10^{-10}$ inches.

One of the advantages of the present frequency-responsive control system resides in the fact that it is compatible with existing analog and digital equipment. It is quite easy to translate from either analog or digital intelligence into frequency intelligence and vice versa. The techniques for accomplishing this will be apparent to those skilled in this art.

Figure 11:
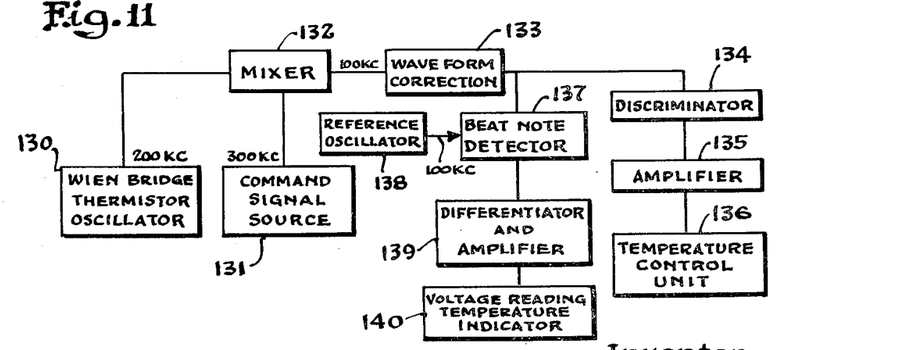
FIG. 11 is a diagrammatic illustration of a circuit arrangement embodying the sensitive control system as adapted for the control of temperature.

In FIG. 11, the control system of this invention is illustrated in connection with a temperature-control application. Such a system may include a Wien bridge thermistor oscillator 130 having an output signal the frequency of which ranges about 200 kc. A source of temperature-command signals is shown at 131 and it may have an output signal the frequency of which ranges about 300 kc. The command signal source 131 may comprise an adjustable frequency oscillator or may consist of a tape-recorded temperature control sequence or any other form of command signal source. The oscillator 130 and the command signal source 131 feed mixer stage 132, the output of which ranges about a frequency value of 100 kc. and is fed through a waveform correction circuit 133 to shape the 100 kc. waveform into a true sine wave for compatibility with crystal discriminators.

From the waveform correction circuit, the 100 kc. variable frequency signal feeds into a discriminator 134, amplifier 135, and finally to a temperature-control unit 136 which may be in the form of a relay or other suitable control mechanism, such as the servo unit of FIG. 6, for accurately varying the temperature in a zone that is being temperature-controlled.

It will be understood that the Wien bridge thermistor oscillator 130 has a frequency-control element in the form of a thermistor located in the zone that is being temperature-controlled and as the zone temperature reaches its commanded value, this fact is fed back into the system by virtue of the control action of the thermistor in the Wien bridge oscillator 130. The operation of the circuit arrangement of FIG. 11 is believed to be self-evident in view of the previous descriptions of the control system.

The control system is also useful for providing an accurate temperature-indicating system and such an arrangement is also shown in FIG. 11, wherein a beat note detector 137 is connected to receive the output of the waveform correction circuit 133 and compare it with a fixed 100 kc. signal supplied from a reference oscillator 138. The resultant output from beat note detector 137 is supplied to a differentiator and amplifier 139 which in turn feeds into a voltage-reading temperature indicator 140 which may be any suitable form of D.C. voltmeter.

It has been mentioned hereinbefore that temperature compensation can be employed in order to stabilize the frequency of the various oscillator components employed in this control system. It is contemplated that the critical oscillator components may be mounted in a suitably thermally regulated chamber and controlled by the circuit of FIG. 11, in which instance the Wien bridge thermistor oscillator 130, or at least the thermistor control element thereof, would also be in the temperature-regulated chamber.

Figure 12:
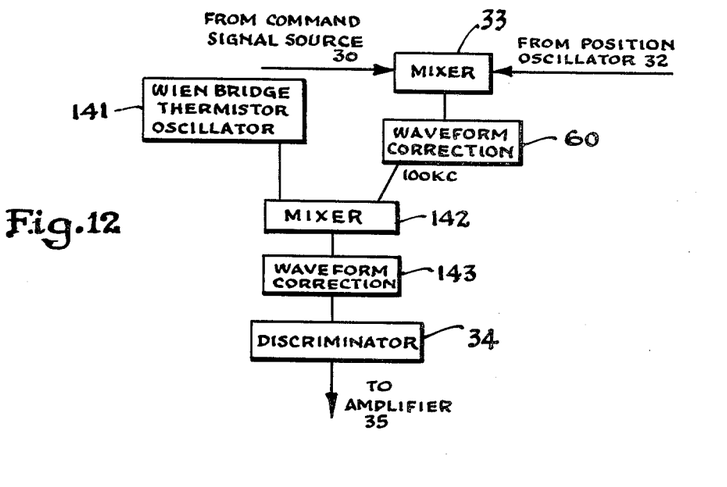
FIG. 12 is a diagrammatic illustration of a portion of a temperature sensitive control component illustrating the manner of its connection into a control system such as is shown in FIGS. 1 and 2.

An alternative arrangement for providing temperature compensation that is also contemplated in accordance with the present invention, as shown in FIG. 12, employs a Wien bridge thermistor oscillator 141 which would be subjected to the same ambient temperature as the remaining oscillator components of the control system. The thermistor oscillator is shown in operative connection to a portion of the control system that is shown in FIGS. 1 and 2. In this arrangement, the approximately 100 kc. output from the waveform correction circuit 60 is fed to an intermediate mixer stage 142, the input of which is also connected to the thermistor-controlled oscillator 141. The output from the intermediate mixer stage 142 is then fed through a suitable waveform correction circuit 143 and back to the discriminator 34 and amplifier 35 of the main control system. Thus, with the arrangement of FIG. 12, temperature compensation is built into the mechanical control system and it cures variable frequency oscillator drift such as results due to changes in ambient temperature.

Figure 13:
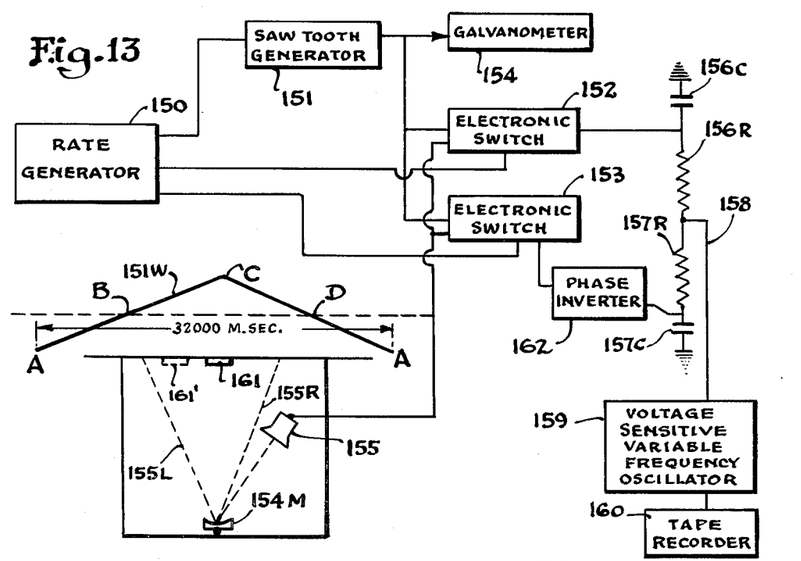
FIG. 13 is a diagrammatic illustration of a profiling arrangement for reading a blueprint and representing the intelligence thereof into a variable frequency signal.

There are numerous applications wherein the frequency-programming sequence for the command signal is to be determined in accordance with the drawing outline on a blueprint, and in FIG. 13 a simplified blueprint-profiling arrangement for preparing a variable frequency command signal representative of the blueprint profile is illustrated. The profiling arrangement is shown as including a rate generator 150 connected to trigger a saw-tooth generator 151 and connected to control the turn-on time of electronic switches 152 and 153. The output from the saw-tooth generator is shown at 151W and, as illustrated, a full timing cycle is assumed to be 32,000 microseconds. The output wave 151W of the saw-tooth generator is applied to a galvanometer 154 having the usual oscillating mirror 154M and this mirror, which is operatively associated with a photocell pickup unit 155 is caused to oscillate back and forth so that the line of sight of the photocell unit 155 may be varied between the right and left limit positions indicated by the dotted lines 155R and 155L, respectively. It will be assumed that when the waveform 151W is at the point A, the line of sight of the photocell 155 is along the line 155L; when the waveform is at the point B, the line of sight is approximately midway between 155L and 155R; at the point C, the line of sight is along the line 155R; and at D, it is the same as B.

The output from the saw-tooth generator in this simplified version of FIG. 13 is also shown as being applied through the electronic switches 152 and 153 to feed a comparison network that comprises capacitor 156C and resistor 156R, capacitor 157C, and resistor 157R. The midpoint of the comparison network has a connection line 158 that may feed a voltage-sensitive variable frequency oscillator 159 which is in turn connected to a tape recorder 160, if the profiling intelligence is to be stored for later use. Alternatively the oscillator 159 could be connected to constitute the command section of the control system of this invention. The photocell unit 155 is electrically connected to turn off each electronic switch at the time that the photocell unit sees a line on the blueprint.

The operation of the profiling apparatus may now be described as follows: The rate generator 150 initiates the saw-tooth generator 151 to develop the waveform 151W which is assumed to begin at point A, as indicated. Simultaneously with the initiation of the saw-tooth generator, the electronic switch 152 is turned on by the rate generator and as the saw-tooth voltage proceeds towards the point B, the galvanometer movement 154 swings the line of sight of the photocell unit 155 clockwise, or from left to right, as viewed in FIG. 13.

The blueprint line is shown at 161, and as the line of sight of the photocell unit 155 reaches the left-hand edge of the line 161, the photocell is energized to turn off the electronic switch 152. Assuming the voltage at point A to be +20 volts and at point B to be +120 volts, the condenser 156C will have been charged to a value of approximately 120 volts by the voltage applied through the switch 152 up to the time that the switch is cut off by the photocell.

It will be apparent that the voltage value that exists by virtue of the photocell's picking up the leaving or left-hand edge of the blueprint line could itself be employed as a representation of the position of the line. However, the additional equipment of the present arrangement permits it to read the center of the line 161 and this is the preferred form of the invention.

The timing of the rate generator 150 is such that when the saw-tooth waveform is at the point C, the rate generator will turn on electronic switch 153 and the negative voltage excursion from C through D to point A of the saw-tooth wave is applied through electronic switch 153 and inverted in phase in the phase inverter 162 to charge capacitor 157C to a positive value that tends to oppose the positive charge on capacitor 156C. As the voltage excursion proceeds from point C to point D, the line of sight of the photocell unit 155 swings from 155R in a counterclockwise direction and approaches the right edge of the blueprint line 161. As soon as the photocell sees the line 161, electronic switch 153 is turned off by the photocell and this determines the magnitude of of the charge that is built up on capacitor 157C.

Assuming that the blueprint line 161 is precisely centered with respect to the sweep of the line of sight of the photocell unit 155, a zero voltage appears on connection line 158 at the output of the comparison network. But assuming the blueprint line were at the position indicated at 161' the voltage built up on capacitor 157C would predominate and a voltage of negative polarity would appear on line 158, the magnitude of the voltage being correlated with the displacement of the line 161' from the center point of the sweep of the line of sight. Similarly if the blueprint line were displaced to the right of center, a positive voltage would appear at the connection line 158. It will be understood that the voltage value and polarity that is applied over line 158 to the voltage sensitive variable frequency oscillator 159 will determine the frequency output.

It should be noted that the technique might also be applied for causing the photocell unit 155 to shift so that the center point of its sweep of line of sight will always be directly over the line. In this instance, a suitable servo mechanism might be connected to the output voltage of line 158 to mechanically control the relative position of the photocell unit. In this instance the changes in position of the photocell unit would be mechanically transmitted to a position oscillator for developing a variable frequency command signal for use in the control system of this invention.

Figure 14:
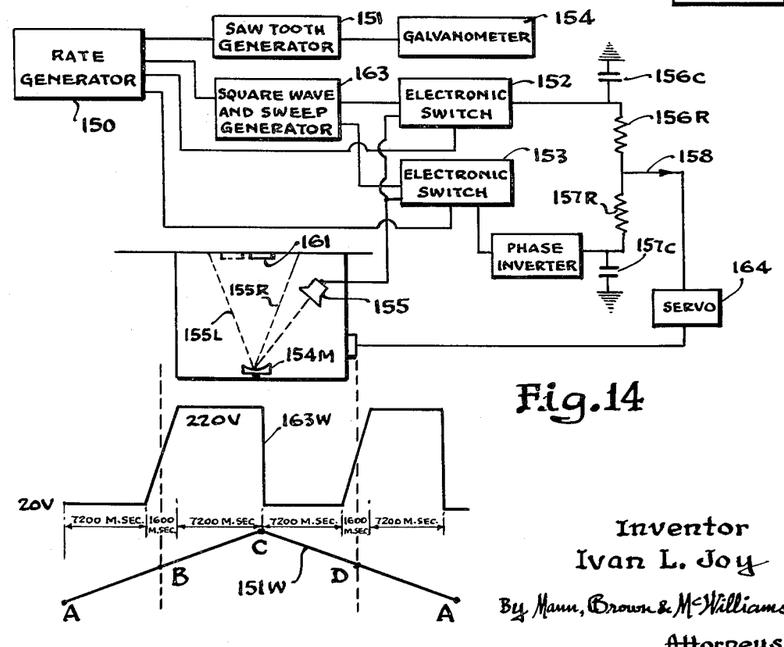
FIG. 14 illustrates a profiling arrangement generally similar to that of FIG. 13 and including a number of circuit refinements for improving the accuracy thereof.

FIG. 14 illustrates a refined profiling arrangement, the major components of which correspond identically with that of FIG. 13. In FIG. 14, however, the rate generator 150 separately initiates the saw-tooth generator 151 and a square wave and sweep generator 163. The output of the generator 163 is shown at 163W and it is characterized by its steep slope at the points corresponding to the B and D points of the saw-tooth wave 151W. The wave 163W is connected to feed through the electronic switches 152 and 153 and therefore it determines the voltage charges that are built up on the condensers 156C and 157C. In the arrangement of FIG. 14 the output from the resistor-capacitor comparison circuit is shown connected to a servo mechanism 164, which in turn, is mechanically linked to the housing of the galvanometer mirror and photocell pickup unit for shifting the photocell until the center point of the sweep of the photocell's line of sight is coincident with the blueprint line 161. The steep slope of the charging voltage waveform 163W provides increased accuracy for the profiling apparatus. Representative values for the timing and voltage of waveform 163W are shown on FIG. 14.

Figure 15:
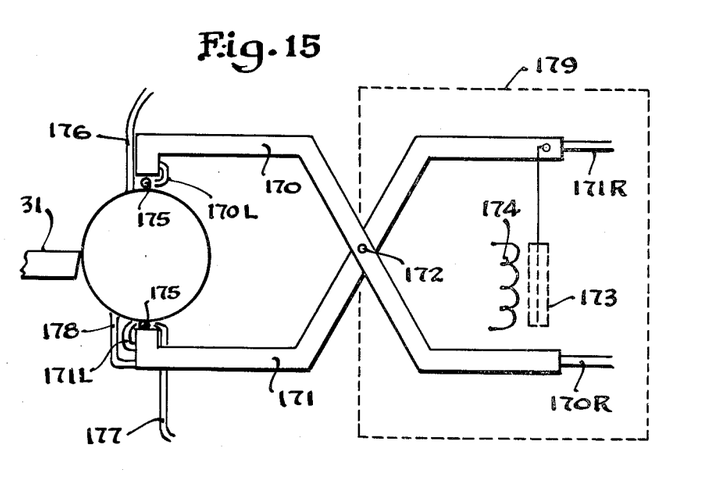
FIG. 15 is a diagrammatic illustration of a caliper for profiling an object and illustrates the connection of such a caliper to a control system such as shown in FIGS. 1 and 2 for representing the dimension of characteristics of the object into a variable frequency signal.

FIG. 15 illustrates a lazytongs type caliper that is useful for measuring the profile of an object and for translating the dimensional characteristics of the object into corresponding frequency values for use in the present control system. The caliper arms are designated 170 and 171, and they are of mating, generally Z shape and cross at a center hinge point 172. The relative opening and closing movement at the right-hand ends of the caliper arms controls the position of a tuning slug 173 relative to its inductance 174. It will be understood that the inductance may be in the tuning circuit of a position oscillator such as appears in FIG. 3, such that movement of the tuning slug 173 is effective to vary the output frequency of the oscillator. At their left-hand ends the arms 170 and 171 provide opposed jaws that may carry diamond, sapphire, or other hard-surfaced points 175 for accurate engagement with opposite surfaces of the object that is being measured.

The caliper of FIG. 15 may, on one hand, be used for measuring the surface of a finished object for the purpose of developing a variable-frequency programming sequence representative of changes in the dimension of the object and, on the other hand, it may be used as a reading device for continuously reading the dimension of a piece that is being machined in a turning lathe. When used as a reading device, it will be used simultaneously with the control system and will check to determine that the controlled member or cutting tool which is shown at 31 has cut the piece to the desired dimension.

It will be assumed, therefore, that the controlled member 31 is commanded by the control system of FIG. 1, and that the depth of cut is determined by the command frequency of this system. The electronic caliper would be used in connection with the position oscillator, but instead of measuring the movement of the controlled member itself, it would measure the changes in dimension of the piece being cut. With this construction and arrangement, the controlled member 31 will cut to a depth determined by the caliper and it will be apparent, therefore, that the accuracy of the system will in no way be dependent upon the dynamic characteristics of the cutting tool and its machine.

In order to assure accurate reading of a piece that is in the process of being cut in a turning lathe, air jets are provided at 176 and 177 to continuously sweep machining particles off the piece being cut. A wiper is also shown at 178 for assisting in this cleaning operation. As illustrated, the caliper arms 170 and 171 may be hollow to provide fluid passages for cooling liquid or cooling air that enters at the right-hand ends as indicated at 170R and 171R and emerges from the orifices shown at orifices 170L and 171L. These cooling liquids may also be temperature-controlled to further improve the stability of the electronic caliper apparatus. Preferably the entire section of the caliper, designated 179, is enclosed in a carefully regulated oven to insure stability of the oscillator that is controlled by the inductance 174.

The foregoing description and the drawings are given merely to explain and illustrate my invention, and the manner in which it may be performed, and the invention is not to be limited thereto, except insofar as the appended claims are so limited since those skilled in the art who have my disclosure before them will be able to make modifications and variations therein without departing from the scope and spirit of the invention.

Typical circuit components for use in the automation system of this invention are listed below:

Beat note detectors 124 (FIG. 1), 111 (FIG. 2), and 137 (FIG. 11)—Radio Engineering, by Henny, 1950 ed., page 437.

Frequency-to-frequency discriminator 121 (FIG. 1)—Electronics Manual for Radio Engineers, by Zeluff and Markus, page 643 (see single side band detector).

Voltage-sensitive variable frequency oscillators 93 (FIG. 7), 103 (FIG. 10), and 159 (FIG. 13)—Radio Engineering, by Henny, 1950 ed., page 826, FIG. 25.

Wien bridge thermistor oscillators 130 (FIG. 11) and 141 (FIG. 12)—Industrial Electronics Control Circuits, by Markus and Zeluff, page 329.

Electronic switches 152 and 153 (FIGS. 13 and 14)—Industrial Electronics Control Circuits, by Markus and Zeluff, page 31.

Servo 36 (FIGS. 1 and 2) and 164 (FIG. 14)—Electronics for Communications Engineers, by Markus and Zeluff, page 513, FIG. 2.

I claim:

1. In a control system for positioning a controlled member automatically, in combination: a superheterodyne type control system including a tape recorder source of audio frequency command signals of a variable frequency characteristic representative of the desired position programming sequence of the controlled member, said frequency characteristic having a single valued ordered frequency value versus position spectrum over a predetermined range of audio frequency band width in which each position is represented by substantially a single corresponding frequency value, a position oscillator having a frequency varying element connected to provide radio frequency reference signals of a variable frequency characteristic representative of the actual position of the controlled member, said last-named frequency characteristic having a single valued ordered frequency value versus position spectrum over a range of radio frequency band width corresponding in range to that of said audio frequency band width, a mixer connected to receive said command signals and reference signals and providing a radio frequency output signal having a predetermined value when the controlled member is in its commanded position, a frequency discriminator connected to respond to said output signal to produce a command voltage of one polarity when the frequency of the output signal deviates in one direction from said predetermined value, to produce a command voltage of opposite polarity when the frequency of the output signal deviates in the opposite direction from said predetermined value, and to produce a null when the frequency of the output signal is said predetermined value, and driving means for positioning the controlled member and directionally responsive in accordance with the polarity of the command voltage from said discriminator.

2. In a control system for positioning a controlled member automatically, in combination: a tape recorder source of audio frequency command signals of d variable frequency characteristic representative of the desired position programming sequence of the controlled member, said frequency characteristic having a single valued ordered frequency value versus position spectrum over a predetermined range of audio frequency band width in which each position is represented by substantially a single corresponding frequency value, a position oscillator having a frequency varying element connected to provide radio frequency reference signals of a variable frequency characteristic representative of the actual position of the controlled member, said last-named frequency characteristic having a single valued ordered frequency value versus position spectrum over a range of radio frequency band width corresponding in range to that of said audio frequency band width, a mixer connected to receive said command signals and reference signals and providing a radio frequency output signal having a predetermined value when the controlled member is in its commanded position, a frequency discriminator having low and high pass input channels and a direct-voltage output with the direct voltage changing oppositely from a reference value in response to opposite frequency departures from said predetermined value, and driving means for positioning the controlled member and directionally responsive in accordance with the direction of the variation from its reference value of the command voltage from said discriminator.

3. A control system for positioning a controlled member and comprising a tape recorder source of audio frequency command signals of a variable frequency characteristic representative of the desired position-programming sequence of the controlled member, said frequency characteristic having a single valued ordered frequency value versus position spectrum over a predetermined range of audio frequency band width in which each position is represented by substantially a single corresponding frequency value, a position oscillator having a frequency varying element connected to said controlled member and responsive thereto to produce radio frequency reference signals of a variable frequency characteristic representative of the actual position of the controlled member, said last-named frequency characteristic having a single valued ordered frequency value versus position spectrum over a range of radio frequency band width corresponding in range to that of said audio frequency band width, means for mixing the command and reference signals to produce an output signal, a temperature-responsive variable frequency oscillator providing a temperature controlled signal, means for mixing the temperature controlled signal and the said output signal to produce a compensated signal the frequency value of which is unaffected by temperature, said compensated signal having a frequency of predetermined value when said controlled member is actually in its commanded position, with the frequency of said compensated signal deviating in opposite directions from said predetermined value corresponding to opposite displacements of said controlled member from its commanded position, and means selectively responsive to opposite frequency departures of said compensated signal from said predetermined value and including driving means operated thereby for correspondingly actuating said controlled member to its commanded position.

4. In a control system for positioning a controlled member automatically, in combination: a tape recorder source of audio frequency command signals of a variable frequency characteristic representative of the desired position programming sequence of the controlled member, said frequency characteristic having a single valued ordered frequency value versus position spectrum over a predetermined range of audio frequency bandwidth in which each position is represented by substantially a single corresponding frequency value, a position oscillator having a frequency varying element connected to provide radio frequency reference signals of a variable frequency characteristic representative of the actual position of the controlled member, said last-named frequency characteristic having a single valued ordered frequency value versus position spectrum over a range of radio frequency bandwidth corresponding in range to that of said audio frequency bandwidth, a mixer connected to receive said command signals and reference signals and providing a radio frequency output signal having a predetermined value when the controlled member is in its commanded position, a frequency discriminator connected to respond to said output signal and selectively responsive to opposite frequency departures from said predetermined value, and driving means for positioning the controlled member and connected for opposite actuation by said frequency discriminator corresponding to said opposite frequency departures of said output signal, wherein said frequency discriminator comprises a low pass channel for cutting off control signals of higher frequency than said predetermined value, a high pass channel for cutting off control signals of lower frequency than said predetermined value and a divider network connected across said channels, with said low pass channel having a crystal tuned to a value only slightly below said predetermined value and with said high pass channel having a crystal tuned to a value only slightly above said predetermined value and matching the crystal of the low pass channel at said predetermined value.

5. In a control system for positioning a controlled member automatically, in combination: a tape recorder source of audio frequency command signals of a variable frequency characteristic representative of the desired position programming sequence of the controlled member, said frequency characteristic having a single valued ordered frequency value versus position spectrum over a predetermined range of audio frequency bandwidth in which each position is represented by substantially a single corresponding frequency value, a position oscillator having a frequency varying element connected to provide radio frequency reference signals of a variable frequency characteristic representative of the actual position of the controlled member, said last-named frequency characteristic having a single valued ordered frequency value versus position spectrum over a range of radio frequency bandwidth corresponding in range to that of said audio frequency bandwidth, a mixer connected to receive said command signals and reference signals and providing a radio frequency output signal having a predetermined value when the controlled member is in its commanded position, a frequency discriminator connected to respond to said output signal and selectively responsive to opposite frequency departures from said predetermined value, and driving means for positioning the controlled member and connected for opposite actuation by said frequency discriminator corresponding to said opposite frequency departures of said output signal, wherein said frequency discriminator is provided with a reference oscillator having an output frequency of said predetermined value, a beat note detector connected to receive output from said reference oscillator and said output signal from said oscillator means, and means connecting the output of said beat note detector to the output of said frequency discriminator for feeding an electrical signal to the output of said discriminator for reducing part of the unbalance thereat and preventing hunting of the driving means.

6. In a control system for positioning a controlled member automatically, in combination: a tape recorder source of audio frequency command signals of a variable frequency characteristic representative of the desired position programming sequence of the controlled member, said frequency characteristic having a single valued ordered frequency value versus position spectrum over a predetermined range of audio frequency bandwidth in which each position is represented by substantially a single corresponding frequency value, a position oscillator having a frequency varying element connected to provide radio frequency reference signals of a variable frequency characteristic representative of the actual position of the controlled member, said last-named frequency characteristic having a single valued ordered frequency value versus position spectrum over a range of radio frequency bandwidth corresponding in range to that of said audio frequency bandwidth, a mixer connected to receive said command signals and reference signals and providing a radio frequency output signal having a predetermined value when the controlled member is in its commanded position, a frequency discriminator connected to respond to said output signal and selectively responsive to opposite frequency departures from said predetermined value, and driving means for positioning the controlled member and connected for opposite actuation by said frequency discriminator corresponding to said opposite frequency departures of said output signal, wherein said frequency discriminator is provided with a reference oscillator having an output frequency of said predetermined value, a frequency to frequency discriminator connected to receive said output signal and output from said reference oscillator to provide a signal for directionally controlling the driving means, switch means for selectively connecting said driving means to respond to one of the outputs of said frequency discriminator and said frequency to frequency discriminator, and a beat note detector connected to receive said output signal and output from said reference oscillator for operating said switch means.

7. In a control system for positioning a controlled member automatically, in combination: a superheterodyne control system including a tape recorder source of audio frequency command signals of a variable frequency characteristic representative of the desired position programming sequence of the controlled member, said frequency characteristic having a predetermined range of audio frequency bandwidth in which each position is represented by substantially a single corresponding frequency value, a position oscillator having a frequency varying element connected to provide radio frequency reference signals of a variable frequency characteristic representative of the actual position of the controlled member, said last-named frequency characteristic having a range of radio frequency bandwidth corresponding in range to that of said audio frequency bandwidth, a mixer connected to receive said command signals and reference signals and providing a radio frequency output signal having a predetermined value when the controlled member is in its commanded position, and a frequency discriminator connected to respond to said output signal and selectively responsive to opposite frequency departures of said output signal from said predetermined value to produce correspondingly varying output command voltages and to produce a null when the frequency of the output signal is said predetermined value, and motor means for positioning the controlled member and directionally responsive in accordance with the variations of the output command voltage from said discriminator.

8. In a control system for positioning a controlled member automatically, in combination: a superheterodyne type control system including a tape recorder source of audio frequency command signals of a variable frequency characteristic representative of the desired position programming sequence of the controlled member, said frequency characteristic having a single valued ordered frequency value versus position spectrum over a predetermined range of audio frequency bandwidth in which each position is represented by substantially a single corresponding frequency value, a position oscillator having a frequency varying element connected to provide radio frequency reference signals of a variable frequency characteristic representative of the actual position of the controlled member, said last-named frequency characteristic having a single valued ordered frequency value versus position spectrum over a range of radio frequency bandwidth corresponding in range to that of said audio frequency bandwidth, a mixer connected to receive said command signals and reference signals and providing a radio frequency output signal having a predetermined value when the controlled member is in its commanded position, and a frequency discriminator connected to respond to said output signal and selectively responsive to opposite frequency departures of said output signal from said predetermined value to produce correspondingly varying output command voltages and to produce a null when the frequency of the output signal is said predetermined value, and motor means for positioning the controlled member and directionally responsive in accordance with the variations of the output command voltage from said discriminator.

9. The control system of claim 8 and including means responsive to movement of said controlled member for feeding an electrical signal to the output of said discriminator for reducing part of the unbalance thereat and preventing hunting of the driving means.

10. The control system of claim 8 and including means responsive to displacement of said driving means from a neutral position thereof for varying the frequency value of the output signal of said oscillator means correspondingly to compensate for dynamic characteristics of the controlled member.

References Cited by the Examiner

UNITED STATES PATENTS

| | | | |
|---|---|---|---|
| 1,404,545 | 1/22 | Richardson | 82—34 |
| 2,146,723 | 2/39 | Dunham et al. | 346—1 |
| 2,372,427 | 3/45 | Johnson | 82—14 |
| 2,374,735 | 5/45 | Crosby | 333—72 X |
| 2,429,771 | 10/47 | Roberts | 318—28.1 |
| 2,489,305 | 11/49 | McLennan | 250—202 |
| 2,505,038 | 4/50 | Gilley | 236—46 |
| 2,521,946 | 9/50 | Rathje | 250—202 |
| 2,537,770 | 1/51 | Livingston et al. | 318—162 |
| 2,578,869 | 12/51 | Washburn | 33—143 |
| 2,598,236 | 5/52 | Dickey et al. | 236—46 |
| 2,628,881 | 2/53 | Adams | 346—1 |
| 2,644,426 | 7/53 | Moore | 121—41 |
| 2,644,427 | 7/53 | Sedgfield et al. | 121—41 |
| 2,724,185 | 11/55 | Harr | 33—143 |
| 2,822,531 | 2/58 | Carroll | 318—162 X |
| 2,882,476 | 4/59 | Wetzel | 318—162 |
| 2,937,365 | 5/60 | Peaslee | 318—39 X |
| 3,028,473 | 4/62 | Dyer et al. | 310—8.9 X |
| 3,090,896 | 5/63 | Bowden et al. | 318—162 X |

FOREIGN PATENTS 218,276  10/58  Australia.

OTHER REFERENCES

Textbook: Electrical Engineering, Theory and Practice, William Erickson and Nelson Bryant, John Wiley and Sons, Incorporated, 1959, 2nd edition, pages 557–563.

ORIS L. RADER, *Primary Examiner.*

MILTON O. HIRSHFIELD, *Examiner.*